Jan. 30, 1968     E. P. HELLER ET AL     3,365,987

FLEXIBLE DRILL AND GUIDE TOOL

Filed Aug. 27, 1965

INVENTORS
EUGENE P. HELLER
RICHARD A. TEXTOR
BY
Howard E. Thompson Jr
ATTORNEY

United States Patent Office 3,365,987
Patented Jan. 30, 1968

3,365,987
FLEXIBLE DRILL AND GUIDE TOOL
Eugene P. Heller, 12 Woodland Road, Madison, N.J. 07940, and Richard A. Textor, R.D., Sussex, N.J. 07461
Filed Aug. 27, 1965, Ser. No. 483,256
5 Claims. (Cl. 77—55)

ABSTRACT OF THE DISCLOSURE

A tool for drilling holes in inaccesible workpiece surfaces such as packing materials in packing glands and the like, said tool comprising a drill in the form of a flat strip of spring metal having a uniform spiral twist throughout its length, one end of the twisted strip providing a cutting edge, the other end being fixedly secured to a cylindrical shank, and the spring characteristics of said strip permitting rotation of said drill while flexed through an arc of as much as 90°, and a guide for said drill comprising a tubular member of lesser length than the flexible portion of said drill for slidably and rotatably receiving said drill, said tubular member having a curved contour disposing the axis of one end at an angle of about 45 to 90° to the axis of the other end, and handle means protruding from said tubular member at a point intermediate the ends thereof facilitating orientation and support of the assembled drill and guide with respect to a workpiece surface.

---

In the many types of machinery and plumbing fixtures where seals are effected around moving shafts, valve stems and the like by compressible packing material in suitable glands or stuffing boxes, the removal of old packing material when repair or replacement is necessary often presents a serious problem. Various tools of the general cork-screw type have been used in the past with a fair degree of success so long as the packing material remains reasonably soft. When the packing material has become hardened through age, compression, or high temperatures of the type encountered in steam valves, however, such tools are grossly inadequate.

The new tools of the present invention, which provide a new approach to these problems by permitting the rapid drilling out and removing of material from inaccessible places such as packing glands, comprise two cooperating parts. The first is a flexible drill which is considered to be novel per se, and which can be rotated while flexed through angles up to and even exceeding 90°. The second is a tubular guide member of a size to closely but freely receive said flexible drill and curved or contoured to disposed the drill entrance and drill exit ends thereof at angularly disposed positions suitably about 45° to 90° out of axial alignment. The guide member also includes a handle or support means, which can be either fixed or movable, to permit accurate positioning of the drill exit end thereof with respect to a surface to be drilled.

Novel features of the present invention will be readily understood from the following description taken together with the accompanying drawing in which preferred adaptations of the invention are illustrated with the various parts thereof identified by suitable reference characters in the several views, and in which.

Figure 1:
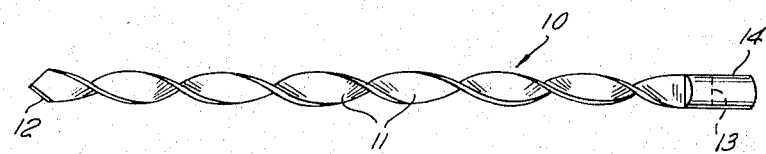
FIG. 1 is a side view of a flexible drill in accordance with the invention.
Figure 2:
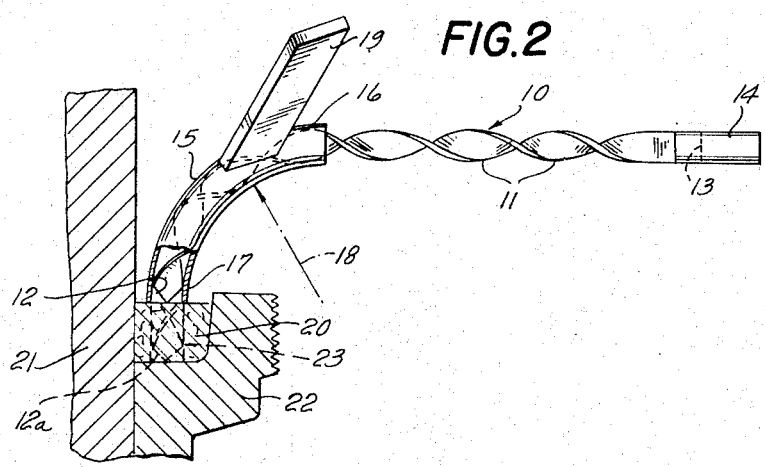
FIG. 2 is a side view of the flexible drill in a guide member according to the invention shown in operative relation to a typical workpiece and with parts thereof broken away and in section.

The flexible drill 10 as shown in FIGS. 1 and 2 comprises an elongated narrow strip of spring steel or like material twisted throughout its length to provide a uniform spiral 11, with one end being fashioned to a cutting edge 12 and the other end 13 extending into and fixedly secured to a cylindrical shank 14 adapted to fit the chucks of conventional hand drills, electric drills and the like.

The desired twisting to form the spiral 11 is effected when the metal is in the annealed condition and then, after shaping the cutting edge 12 and brazing, welding, or otherwise securing the shank 14 in place, the assemblage is heat treated acording to well-known techniques to restore the temper and characteristic springiness of the metal. While this generally provides sufficient hardening of the cutting edge 12 the latter can, if desired, be subjected to supplemental hardening treatment to provide a more durable cutting edge.

The size and proportions of the drill 10 can vary widely depending on the size of workpiece to be drilled and the diameter and depth of holes desired. In most instances the diameter of the drill will be within the range of about 1/8" to 3/8", but for special small work it might be as small as 1/16", and for heavy duty jobs a diameter of 1/2" or larger can be practical.

In FIG. 2 of the drawing the drill 10 is shown in flexed, interfitting relation with a tubular guide 15 of curved contour with the drill extending therethrough from the entrance end 16 to the exit end 17. It will be seen that the drill assumes the curved contour of the guide, and in this curved contour the drill is free to rotate and to be moved axially through the guide in a drilling operation.

The curvature of the guide 15 as shown in the drawing disposes the axes of the entrance and exit ends thereof at an angle of about 90° out of alignment, with the radius 18 equivalent to about five times the diameter of the drill. This represents rather extreme but highly practical conditions for drilling in inaccessible areas. It is to be understood, however, that any angular disposition of the entrance and exit ends 16, 17 of the guide 15 within the general range of 0° to 90° and preferably about 45° to 90° can be practical in various uses and adaptations of the invention.

The size of the radius 18 relative to the diameter of the drill can also vary considerably, and particularly with drills of smaller diameter, such radius may be several times the value above mentioned. On the other hand, with drills of larger diameter the radius 18 may in some instances be somewhat less than five times the drill diameter, particularly if the angular disposition of the entrance and exit ends 16, 17 of the guide is substantially less than 90°. For a full 90° curvature of the guide 15 it is considered that at least three loops or turns of the drill spiral 11 should fit between the ends 16, 17 of the curvature of the guide. Thus in determining the minimum value for the radius 18, the number of turns per unit length of the drill spiral 11 is a contributing factor.

In the assemblage shown in FIG. 2 the guide 15 is provided with a protruding handle or support member 19 which can be held by the hand or clamped in a suitable support to facilitate holding of the exit end 17 of the guide in close proximity and in proper orientation with respect to a workpiece. As a typical workpiece there is shown a body of packing material 20 occupying space between a shaft 21 and packing gland 22. With the guide end 17 held firmly against the packing material 20, the drill is rotated about its axis and fed longitudinally of its axis to advance the cutting end 12 to the dotted position 12a, thereby cutting a hole 23 of substantial size in the packing material.

In some instances the cutting of a single hole 23 may be sufficient to permit insertion of a pointed tool to pry loose and lift out the packing material 20. When the packing material is hard and dry, however, it is preferable to drill a plurality of holes 23 at intervals circumferentially of the shaft 21. Indeed, with a very dry packing material it may be desirable to drill a plurality of juxtaposed or connected holes 23, or even to drill a series of connected or substantially connected holes 23 extending completely around the shaft 21 to so weaken the packing material as to permit its easy removal.

Drilling holes in packing material as above described is accomplished quickly with the new flexible drill and guide, and it is found that hard packing material can be removed in this way in a very small fraction of the time required by previously available tools and methods. A single drill and guide combination with suffice for many packing removal jobs since it can be used in a practical way so long as the drill diameter is equal to or greater than about one third the width of the packing material surface but not so great as to prevent seating of the guide end 17 on such surface.

It is important to note that the end of the drill 12a forms a hole 23 which is essentially perpendicular to the workpiece, provided the guide end 17 is supported firmly against the workpiece surface. Thus in addition to the removal of packing material, the new drill and guide combination provides a practical means for drilling perpendicular holes at inaccessible locations in wood, plastics, soft metals and other workpieces. In this connection it is to be understood that the contour of the drill end 12 can be varied to provide the desired type of cutting edge for the material to be drilled.

Figure 3:
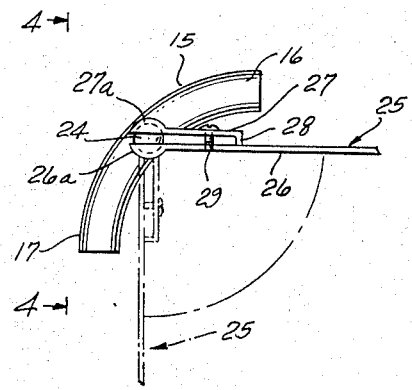
FIG. 3 is a view similar to FIG. 2 showing the guide member alone and indicating a modified and adjustable form of handle for said member.

Any fixed handle such as the handle 19 on the guide 15 could somewhat limit the manipulation of the guide 15 and the drill-guide assemblage in inaccessible places. This problem can be avoided by providing an adjustable handle. One form of such adjustable handle has been shown in FIGS. 3 and 4 of the drawing wherein the guide 15 is provided with a ball part 24 midway between the ends 16, 17 thereof protruding in a direction essentially parallel to the axis of curvature of the guide 15. Cooperating with the ball part 24 is a composite handle 25 comprising a long part 26 and a short part 27 having an offset end 28 for bearing against the long part. Aligned ends 26a and 27a of said long and short parts have a cupped contour for partially enveloping the ball part 24 to provide clamping engagement therewith when a screw or other fastener 29 connecting the parts 26, 27 is tightened.

Figure 4:
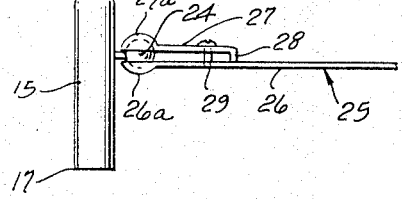
FIG. 4 is a view of the guide member in the direction 4—4 of FIG. 3 showing the handle in a different position of adjustment.

With this type of ball and socket mounting of the handle there is great freedom of orientation of the handle with respect to the guide 15 as readily seen from the drawing. By way of illustration, with the handle in the full line position shown in FIG. 3 and the drill entering the end 16 of the guide, the handle is disposed to the left of the path of movement of the drill, whereas with the handle in the dotted position and the drill entering the end 17, the handle is to the right of the path of drill movement. FIG. 4 on the other hand indicates a maximum swinging of the handle 25 away from the path of drill movement through the guide 15.

Various changes and modifications in the flexible drill and drill guide herein disclosed will occur to those skilled in the art, and to the extent that such changes and modifications are embraced by the appended claims, it is to be understood that they constitute part of the present invention.

We claim:

1. A drill guide consisting of a tubular body open at both ends and having a uniform bore diameter between said ends, the full length of the tubular body between said ends consisting of a smoothly curved contour extending through an arc of 45 to 90°, the radius of said arc being about five times the bore diameter of said tubular body, and means integrally secured to an outer side surface of said body intermediate the ends thereof, and protruding away from a plane defined by said arc, providing a handle for said tubular body.

2. A drill guide as defined in claim 1 wherein said handle means comprises a ball part midway between the ends of said tubular body and protruding therefrom on an axis parallel to the axis of said arc, and an adjustable handle having clamp engagement with said ball part.

3. A flexible drill comprising a flat strip of spring metal having a uniform spiral twist throughout its length, one end of said twisted strip providing a cutting edge, the other end being fixedly secured to a cylindrical shank adapted to fit conventional drill chucks, and the spring characteristics of said strip permitting rotation of said drill while flexed through an arc of as much as 90°.

4. A flexible drill as defined in claim 3 wherein the spring characteristics are such as to permit rotation of the drill when flexed through a 90° curve having a radius as small as about five times the drill diameter.

5. The combination of a drill as defined in claim 3 further including a drill guide, said drill guide consisting of a tubular body open at both ends and having a uniform bore diameter between said ends slidably and rotatably receiving said drill, and the full length of said tubular body between said ends having a smoothly curved contour extending through an arc of 45 to 90°, the radius of said arc being about five times the bore diameter of said tubular body, and means integrally secured to an outer side surface of said body intermediate the ends thereof, and protruding away from a plane defined by said arc, providing a handle for said tubular body.

References Cited
UNITED STATES PATENTS

| | | | |
|---|---|---|---|
| 988,092 | 3/1911 | Hanlin et al. | 77—70 |
| 2,958,349 | 11/1960 | McNutt | 145—129 XR |
| 3,006,223 | 10/1961 | Broussard | 144—106 XR |

FOREIGN PATENTS

| | | |
|---|---|---|
| 7,386 | 9/1879 | Germany. |

FRANCIS S. HUSAR, *Primary Examiner.*